(12) United States Patent
Wang

(10) Patent No.: US 9,158,427 B1
(45) Date of Patent: Oct. 13, 2015

(54) ELECTROMAGNETIC SENSING TOUCH SCREEN

(71) Applicant: NETIO TECHNOLOGIES CO., LTD., Taipei (TW)

(72) Inventor: Chun Hsiao Wang, Taipei (TW)

(73) Assignee: NETIO TECHNOLOGIES CO., LTD., Taipei (TW)

( * ) Notice: Subject to any disclaimer, the term of this patent is extended or adjusted under 35 U.S.C. 154(b) by 31 days.

(21) Appl. No.: 14/224,228

(22) Filed: Mar. 25, 2014

(51) Int. Cl.
| | |
|---|---|
| *G06F 3/041* | (2006.01) |
| *G06F 3/045* | (2006.01) |
| *G01B 7/14* | (2006.01) |
| *G01B 7/30* | (2006.01) |
| *H01F 5/00* | (2006.01) |
| *G09B 5/04* | (2006.01) |
| *G06F 3/046* | (2006.01) |
| *G06F 3/044* | (2006.01) |

(52) U.S. Cl.
CPC ............... *G06F 3/046* (2013.01); *G06F 3/044* (2013.01)

(58) Field of Classification Search
CPC ....... G06F 3/044; G06F 3/0416; G06F 3/046; G06F 3/048
USPC ............... 345/173–174; 434/317; 324/207.17
See application file for complete search history.

(56) References Cited

U.S. PATENT DOCUMENTS

| | | | |
|---|---|---|---|
| 2004/0155871 A1* | 8/2004 | Perski et al. .................. 345/174 |
| 2004/0219501 A1* | 11/2004 | Small et al. .................. 434/317 |
| 2008/0158180 A1* | 7/2008 | Krah et al. .................... 345/173 |
| 2012/0068964 A1* | 3/2012 | Wright et al. ................ 345/174 |
| 2013/0141085 A1* | 6/2013 | Suzuki ..................... 324/207.17 |
| 2014/0218338 A1* | 8/2014 | Kim .............................. 345/174 |
| 2015/0035787 A1* | 2/2015 | Shahparnia et al. .......... 345/174 |

* cited by examiner

*Primary Examiner* — Lin Li
(74) *Attorney, Agent, or Firm* — Lin & Associates IP, Inc.

(57) ABSTRACT

The present invention discloses an electromagnetic sensing touch screen, which includes a display panel, a sensing capacitor matrix, select units, voltage controlled oscillators (VCOs), digital potentiometers, EM (electromagnetic) wave receive/detection units, a standard EM wave transmit unit and a control unit. A single detection unit consists of a corresponding select unit, VCO, digital potentiometer and EM wave receive/detection unit. The control unit drives the standard EM wave transmit unit to transmit standard EM wave, and further controls the EM wave receive/detection units to receive sensed capacitance values from the sensing capacitor matrix in a scanning manner. As a result, each EM wave receive/detection unit generates a respective detection signal for determining the location of the finger(s) and checking how the finger(s) approaches to or actually touches the sensing capacitor matrix, thereby generating finger location information and implementing the multipoint touch and display function.

7 Claims, 4 Drawing Sheets

ELECTROMAGNETIC SENSING TOUCH SCREEN

BACKGROUND OF THE INVENTION

1. Field of the Invention

The present invention generally relates to a touch screen, and more specifically to an electromagnetic sensing touch screen using the frequency drift of the specific electromagnetic wave to detect the finger(s) location and implement a function of multipoint touch and display.

2. The Prior Arts

Modern computers use graphic user interface as human to machine interaction, mouse, keyboard and touch screen are commonly used as input device. The touch screen can be constructed in many ways, and some typical examples of common technologies to build touch sensors are shown below:

1. Resistive type touch sensor
2. Surface capacitance
3. SAW
4. IR
5. Projected capacitance Different sensing method can provide different application problems in final application environment, for example the Projected capacitance touch sensor will be affected by radio frequencies emissions that nearby the harmonic of PCT touch sensor scanning frequency, the touch controller may report false information cause by the radiate radio noise.

It is therefore new technique developed to overcome false operation caused by radiate radio emissions nearby scanning harmonics, an electromagnetic sensing touch screen can overcome the RS problems by receiving beacon RF signals that fingers touch can affect such receiving and can be detected by controller that no ambient radiate can interference this new method.

Therefore, it is greatly needed for an electromagnetic sensing touch screen to implement wirelessly selecting and controlling the smart television by use of a wireless touch screen device provided with wireless control and touch screen functions, which is further enhanced by a smart set-top box and a wireless router, thereby solving the above problems in the prior arts.

SUMMARY OF THE INVENTION

The primary object of the present invention is to provide an electromagnetic sensing touch screen for implement a function of multipoint touch and display by use of the frequency drift of the specific electromagnetic wave due to the capacitance change to detect the finger(s) location. Specifically, the electromagnetic sensing touch screen comprises a display panel, a sensing capacitor matrix, select units, voltage controlled oscillators (VCOs), digital potentiometers, EM (electromagnetic) wave receive/detection units, a standard EM wave transmit unit and a control unit. A corresponding select unit, VCO, digital potentiometer and EM wave receive/detection unit forms a detection unit. The display panel is connected to an external image input device for receiving image information and display the corresponding image.

More specifically, the sensing capacitor matrix is provided close to the display panel and comprises sensing capacitor units, each corresponding to a specific region of the image displayed by the display panel. The sensing capacitor matrix may change the effective capacitance based on how close the finger(s) is, and thus the resonant frequency drift is generated. Each detection unit is connected to the corresponding sensing capacitor unit.

Each select unit comprises a plurality of multiplexers for receiving the sensed capacitance values from the sensing capacitor matrix. One of the sensed capacitance values is selected as the resonant capacitor for the VCO used as a resonant circuit according to the scan select signal. In case of no touch, the VCO controlled by the control unit can employ a correction procedure to maintain the capacitance differences among the sensing capacitor matrix such that the sensed capacitance values from the sensing capacitor matrix can be correctly received and taken as the standard signal upon being touched.

In addition, the VCO receives the final sensed capacitance value and the voltage control signal from the corresponding digital potentiometer for controlling the varactor diode, and generates the local oscillation signal with the local oscillation frequency. The EM wave receive/detection unit uses the local oscillation signal to receive the local standard EM wave, and thus generates the detection signal. The control unit is connected to the EM wave receive/detection unit to receive the detection signal, performs the recognition process for received frequency intensity, and generates the frequency control signal and the scan select signal. The digital potentiometer receives the frequency control signal to perform the digital-to-analog conversion (DAC), and the voltage control signal is generated. Therefore, when the finger(s) approaches and the effective capacitance value changes, the frequency drift is caused due to the change of capacitance such that the VCO frequency drifts and the intensity of the local standard EM wave received also changes.

The local standard EM wave transmit unit is driven by the control unit to generate the standard EM wave containing the standard signal with the preset standard frequency, which is transmitted to each EM wave receive/detection unit.

Therefore, the present invention can perform the finger detection process to correctly detect the location of the finger(s), and further determine how close the finger(s) approaches to the sensed capacitor matrix or whether the finger(s) touches the sensed capacitor matrix. The finger detection process preferably comprises the initialization operation and the detection operation.

Specifically, the control unit first performs the initialization operation. When the finger(s) is away from the sensed capacitor matrix, the local oscillation signal frequency of the VCO does not drift, and the standard EM wave transmitted by the standard EM wave transmit unit can be received and the received standard EM wave has the maximum intensity. Meanwhile, the control unit manipulates the select units to sequentially receive all the sensed capacitance values from the sensing capacitor matrix and thus generate the final sensed capacitance signal. Each time, the final sensed capacitance signal is used to generate the VCO frequency and receive the local standard EM wave, and particularly the intensity of the local standard EM wave reversely represents how the finger(s) approaches to the sensing capacitor matrix. When all the effective touch regions of the display panel are scanned, the VCO may each time generate the local oscillation signal based on the final sensed capacitance signal. Also, the capacitance value of each sensing capacitor unit possibly varies due to the process drift such that the local oscillation signals generated by the different VCOs may have the problem of the resonant frequency drift if not touched. The present invention can perform the correction procedure to drive the controller to employ the control information so that the local oscillation signal is adjusted and the detection signal generated by the EM wave receive/detection unit for detecting the standard EM wave is the maximum. At the same time, the control unit sequentially receives all the local oscillation signals of the VCOs to generate the voltage control information for compensation, and the VCO frequency is maintained to the maximum allowable to be received. Further, the voltage control signal is generated by the digital potentiometer, and received by the VCO to continuously adjust the local oscillation frequency of the local oscillation signal until the control unit correctly assures that the finger(s) does not approach to or touch the sensing capacitor units. Then, the control unit stores the voltage control information and the initialization operation is thus completed.

In other words, the initialization operation is primarily intended to correct the whole touch process of the electromagnetic sensing touch screen according to the present invention so as to improve the stability and preciseness of the touch function.

As for the detection operation, the finger(s) may approach to or touch the sensing capacitor units, the control unit can directly employ the voltage control information previously stored to transfer to the VCOs through the digital potentiometers such that each VCO changes the corresponding local oscillation frequency based on the finger location, causing the detection signal of the corresponding EM wave receive/detection unit to change. At this time, the control unit may generate the corresponding finger detection information by detecting the detection signal for presenting the finger location, whether the finger(s) approaches to or touches the sensed capacitor units.

Therefore, when the finger(s) is far away, the detection signal of the EM wave receive/detection unit has the maximum intensity, and as the finger(s) approaches, the intensity of the detection signal decreases. It is possible to confirm that the finger(s) approaches to or touches the sensed capacitor units by checking if the intensity of the detection signal decreases to a predetermine threshold, thereby implementing the correct finger detection operation for the multipoint touch and display function.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

The present invention may be embodied in various forms and the details of the preferred embodiments of the present invention will be described in the subsequent content with reference to the accompanying drawings. The drawings (not to scale) show and depict only the preferred embodiments of the invention and shall not be considered as limitations to the scope of the present invention. Modifications of the shape of the present invention shall too be considered to be within the spirit of the present invention.

Figure 1:
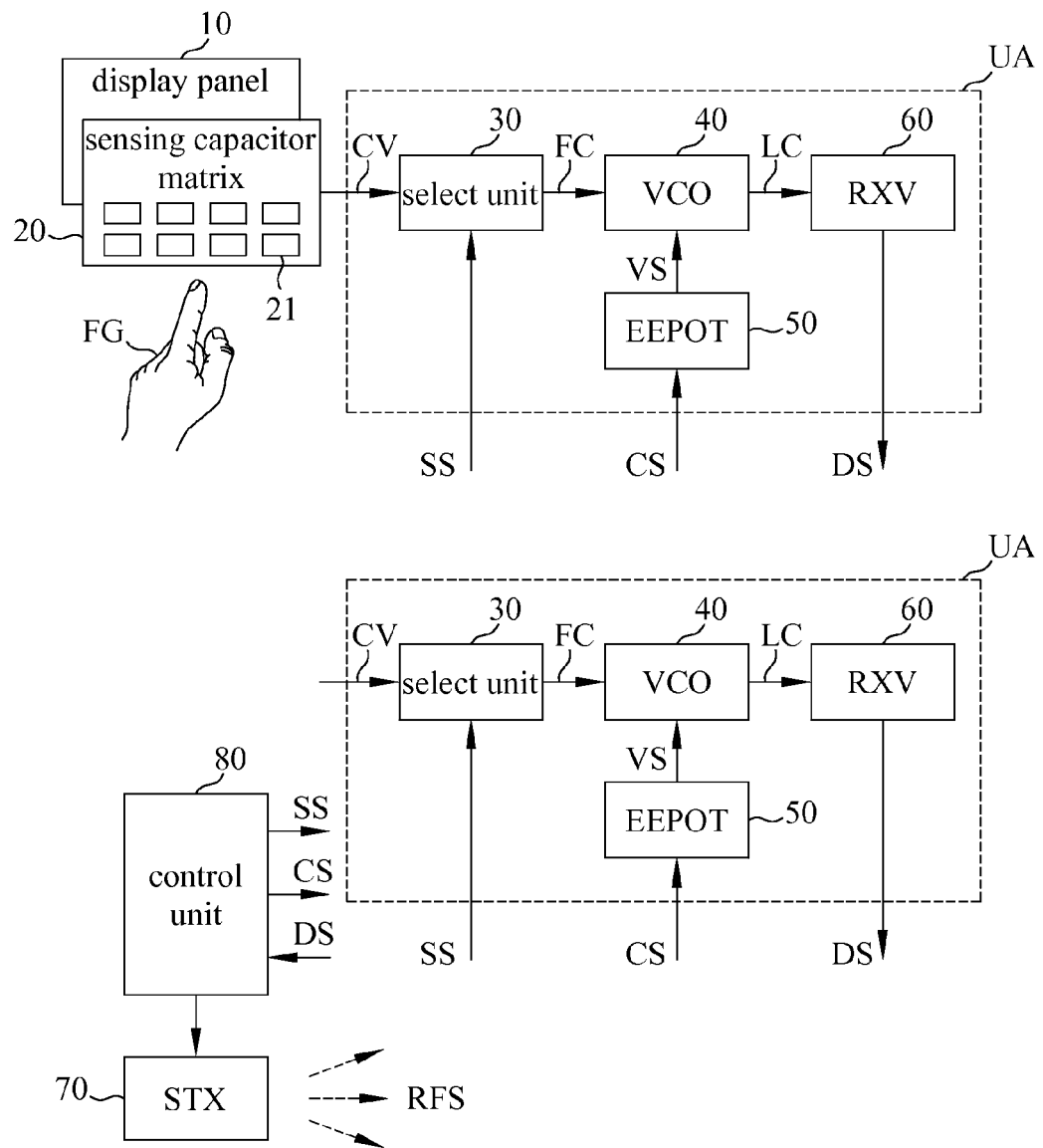
FIG. 1 is a view showing the electromagnetic sensing touch screen according to one of the embodiment of the present invention.

Please refer to FIG. 1 illustrating the electromagnetic sensing touch screen according to one of the embodiment of the present invention. As shown in FIG. 1, the electromagnetic sensing touch screen according to the present invention generally comprises a display panel 10, a sensing capacitor matrix 20, a plurality of select units 30, a plurality of voltage controlled oscillators (VCOs) 40, a plurality of digital potentiometers (EEPOT) 50, a plurality of EM (electromagnetic) wave receive/detection units (RXV) 60, a standard EM wave transmit unit (STX) 70 and a control unit 80. In particular, the select units 30, the VCOs 40, the digital potentiometers 50, the EM wave receive/detection units 60, the standard EM wave transmit unit 70 and the control unit 80 constitute a touch panel. Additionally, the corresponding select unit 30, VCO 40, digital potentiometer 50 and EM wave receive/detection unit 60 constitutes a single detection unit UA. Thus, the electromagnetic sensing touch screen of the present invention substantially comprises a plurality of detection units UA. Specifically, the present invention employs the EM wave frequency drift to detect the location of the finger(s) and generate the finger location information, thereby implementing the multipoint touch and display function.

The display panel 10 is preferably an electronic device with the function of display, like LCD panel, connected to the image input device, like the display card or the graphics chip for the computer, used to receive the image information and display the corresponding image.

Specifically, the sensing capacitor matrix 20 is fully or partly transparent, and provided close to the display panel 10. The sensing capacitor matrix 20 generally comprises a plurality of sensing capacitor units 21, arranged in X columns and Y rows of a matrix. Each sensing capacitor unit 21 corresponds to one specific region of the image displayed by the display panel 10. The sensing capacitor units 21 are substantially sensing capacitor nodes formed by a plurality of horizontal driving lines (not shown) and a plurality of vertical sensing lines (not shown), which are interlaced to each other. The driving line and the sensing lines interlaced are not physically in contact, but separated by a distance or by a high impedance film. The sensing capacitor matrix 20 may change the effective capacitance value based on how close the finger(s) FG approaches, thereby generating the sensed capacitance value CV.

The select unit 30 of each detection unit UA is connected to one corresponding sensing capacitor unit 21 of the sensing capacitor matrix 20, and preferably comprises a plurality of multiplexers (not shown), like 4:1 multiplexers or 8:1 multiplexers, which are hierarchically arranged for receiving all the sensed capacitance values CV from the sensing capacitor matrix 20, selecting one sensed capacitance value CV as the final sensed capacitance value FC according to the scan select signal SS, and then outputting the final sensed capacitance value FC.

The VCO 40 receives the final sensed capacitance value FC and the voltage control signal VS from the digital potentiometer 50, and generates the local oscillation signal LC corresponding to the local oscillation frequency. That is, the local oscillation frequency is adjusted according to the final sensed capacitance value FC and the voltage control signal VS. Therefore, if the voltage control signal VS does not change, the local oscillation frequency will change as the final sensed capacitance value FC changes such that the local oscillation frequency may change due to the finger(s) FG approaching to or touching the sensing capacitor matrix 20.

The EM wave receive/detection unit 60 receives the local oscillation signal for receiving the standard EM wave RFS containing the standard signal with the preset frequency from the standard EM wave transmit unit 70, and generates the detection signal DS after the detection process, wherein the standard EM wave RFS has a preset standard frequency. It is preferred that the EM wave receive/detection unit 60 is implemented by a circuit that comprises an antenna (not shown) for receiving the standard EM wave RFS, and a signal detector (not shown) for detecting the detection signal DS, which represents the intensity of the received signal. In the practical operation, the closer the local oscillation frequency of the local oscillation signal gets to the super-heterodyne standard frequency of the standard EM wave RFS, the larger the detection signal DS, and this indicates that the finger(s) gets away from the sensing capacitor matrix 20. Alternatively, as the frequency drift between the local oscillation frequency and the standard frequency becomes larger, that is, the finger(s) gets closer to the sensing capacitor matrix 20, the touch function is activated if the detection signal DS reaches the preset threshold.

The control unit 80 can be implemented by a microcontroller (MCU), connected to all the select units 30, the digital potentiometers 50 and the EM wave receive/detection units 60 for generating the scan select signal SS used to control each select unit 30 to select the final sensed capacitance value FC and at the same time receive the detection signal DS so as to perform the frequency modulation and generate the frequency control signal CS, which is further received by the digital potentiometer 50.

The digital potentiometer 50 is preferably implemented by the electrically erasable potentiometer (EEPOT) available in the present market, such as X9313 provided by Xicor Inc. or MX5128 chip provided by MAXIM Integrated Products, Inc., which performs the potential adjustment based on the frequency control signal CS so as to generate the voltage control signal VS. The VCO 40 may adjust the local oscillation frequency of the local oscillation signal LC according to the voltage control signal VS.

The standard EM wave transmit unit 70 is driven by the control unit 80 to generate the standard EM wave RFS, which is further transmitted to the EM wave receive/detection unit 60 of each detection unit UA.

Figure 2:
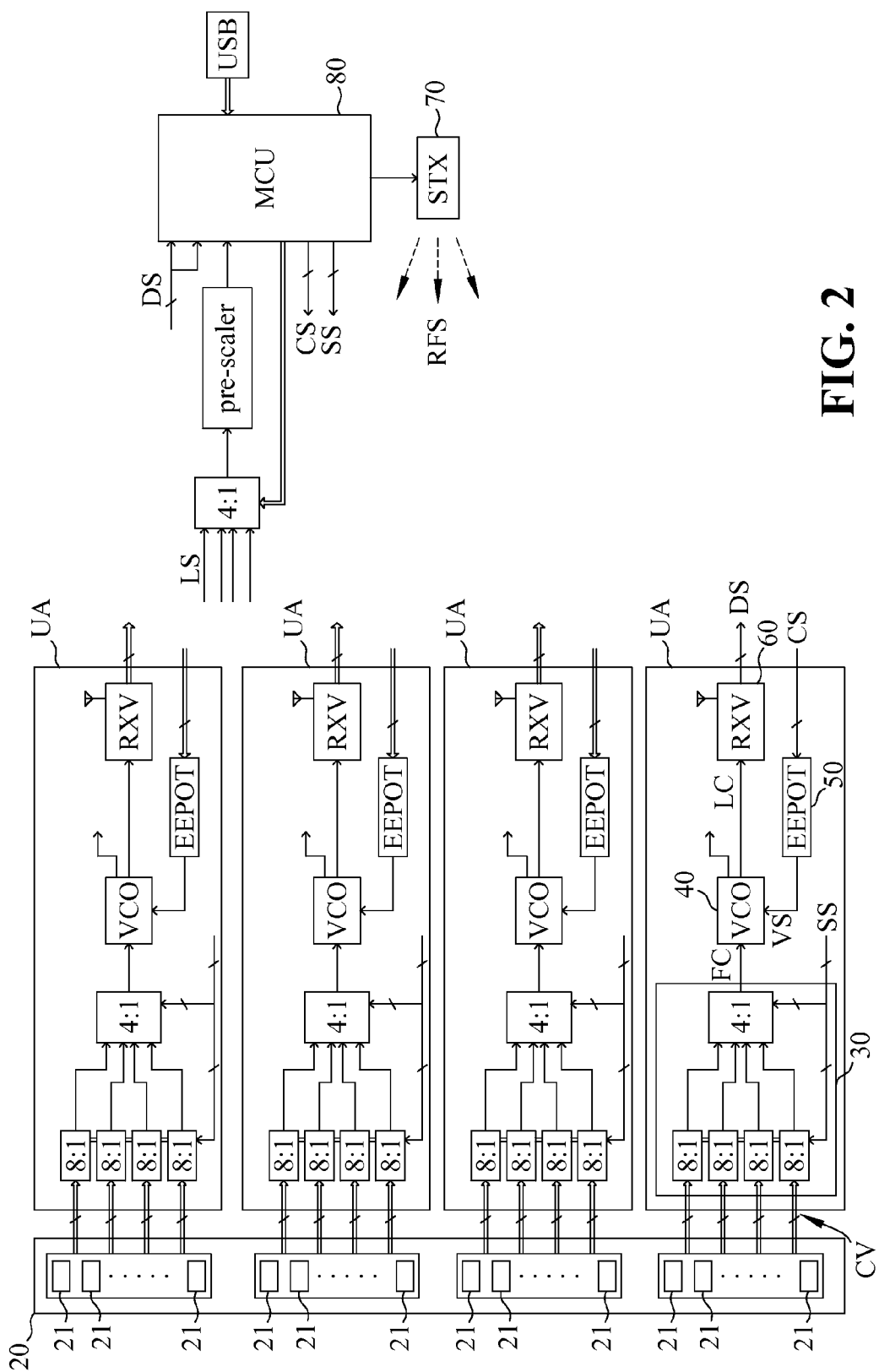
FIG. 2 is a view showing one illustrative circuit for the electromagnetic sensing touch screen according to the present invention.

To further explain the practical operations and the aspects of the present invention in detail, please refer to FIG. 2 showing one illustrative circuit for the electromagnetic sensing touch screen according to the present invention. However, it should be noted that the circuit disclosed in FIG. 2 is only an illustrative example, and not intended to limit the scope of the present invention. In other words, those electronic devices with the equivalent functions mentioned above are all included in the present invention. For example, the fact that the final sensed capacitance value FC will eventually change is employed by the illustrative circuit to cause the local oscillation frequency to accordingly change, or alternatively, the final sensed capacitance value FC is connected to the resonant tank circuit and used to cause the receive frequency of the receiver to drift such that the intensity of the standard received signal changes due to the frequency drift of the receiver.

More specifically, one of the primary aspects of the present invention is that the wireless manner using the radio receiver and transmitter is employed to determine whether the received signal changes, and thus, all the designs using the resonant tank circuit and the phenomenon of the resonant frequency drift should be included in the scope of the present invention, regardless of the types of transmitter or receiver provided.

In the circuit shown in FIG. 2, four detection units UA are included, and the sensing capacitor matrix 20 comprises 32×4 sensing capacitor units 21, which are divided into four groups, each group comprising 32 sensing capacitor units 21. Therefore, the finger location with respect to 32 regions of the display panel 10 can be detected. Also, each select unit 30 may comprise four 8:1 multiplexers and one 4:1 multiplexer so as to sequentially select the final sensed capacitance value FC from the 32 sensed capacitance values CV generated by the 32 sensing capacitor units 21 according to the scan select signal SS.

The control unit 80 may also employ the 4:1 multiplexer and the pre-scaler (or the frequency divider) to sequentially select the local oscillation signal LC generated by the VCO 40 of the 4 detection units UA based on the select signal. In particular, the select signal of the control unit 80 should fit the scan select signal SS for correcting and confirming the oscillation frequency of each VCO 40.

Moreover, the control unit 80 is further connected to the external processing unit or device, like USB (Universal Serial Bus) device or computer, so as to take the sensing capacitor unit 21 according to the scan select signal SS as the finger location information indicating the finger location when the finger(s) approaches to or touches the sensing capacitor matrix 20, and transfer the finger location information. At the same time, the processing unit or device performs the corresponding preset electrical operation, such as executing the preset operation for the icon with respect to the finger location, including transferring the files or the messages, opening the files, performing the execution files, super linking to specific website, or activate specific device like web camera or network phone.

Figure 3:
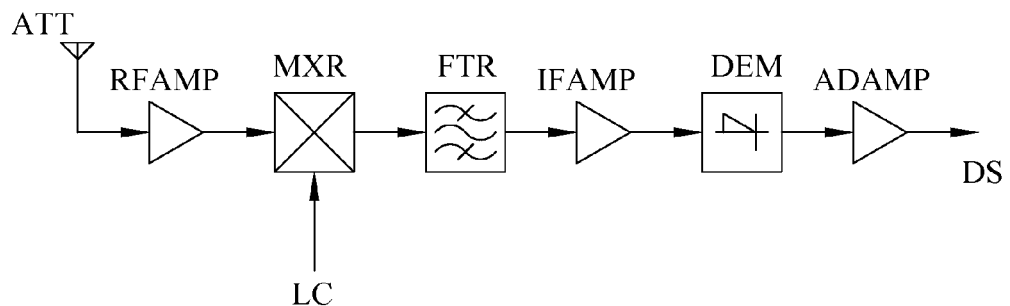
FIG. 3 is a view showing one illustrative circuit for the EM wave receive/detection unit of the electromagnetic sensing touch screen according to the present invention.

One illustrative circuit of the EM wave receive/detection unit 60 is shown in FIG. 3. Similar to the circuit of the traditional radio receiver, the EM wave receive/detection unit 60 generally comprises an antenna ATT, a radio frequency amplifier RFAMP, a mixer MXR, a filter FTR, a intermediate frequency amplifier IFAMP, a demodulator DEM and an audio amplifier ADAMP, which are connected in series. Specifically, the radio frequency amplifier RFAMP, the mixer MXR, the filter FTR, the intermediate amplifier IFAMP, the demodulator DEM and the audio amplifier ADAMP constitutes the above signal detector. In the actual operation, the antenna ATT receives the standard EM wave RFS, the mixer MXR receives the local oscillation signal LC, and the filter FTR, the intermediate amplifier IFAMP, the demodulator DEM and the audio amplifier ADAMP perform the predetermined processes, respectively, so as to generate the detection signal DS. It should be noted that the EM wave receive/detection unit 60 is not limited by the circuit shown in FIG. 3, but all the equivalent circuits for the EM wave receive/detection unit 60 are included in the scope of the present invention.

Since the standard EM wave RFS and the EM wave receive/detection unit 60 are not allowed to be interfered by the external signals, and the detection function should not be affected, it is preferred that the circuit of the EM wave receive/detection unit 60 and the circuit of the antenna ATT and the standard EM wave RFS can be directly connected together through the electrical coupling device. Besides, the grounded shield mask is added to prevent interference due to the external signals.

The electromagnetic sensing touch screen according to the present invention may also employ other receive means like direct detection, regeneration or super regeneration receiver, and further utilize the phenomenon of the resonant frequency drift resulted from the change of the capacitance value to detect the touch action.

Figure 4:
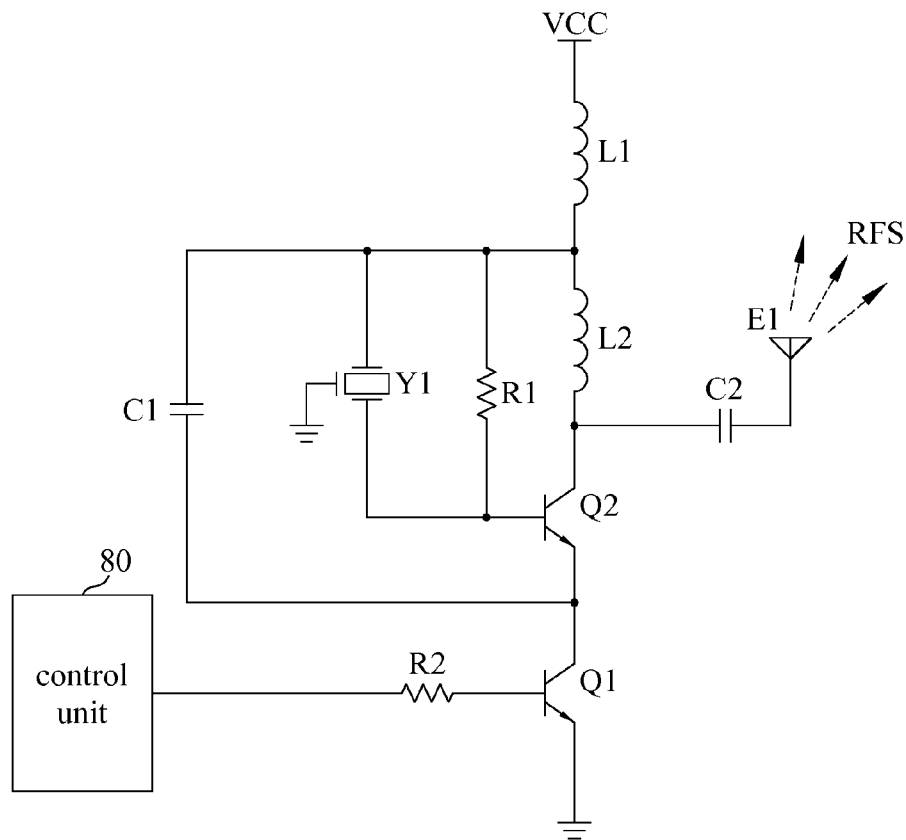
FIG. 4 is a view showing one illustrative circuit for the standard EM wave transmit unit of the electromagnetic sensing touch screen according to the present invention.

Further refer to FIG. 4 showing one illustrative circuit for the standard EM wave transmit unit 70 of the electromagnetic sensing touch screen according to the present invention. As shown in FIG. 4, the standard EM wave transmit unit 70 comprises two transistors Q1 and Q2, two capacitors C1 and C2, two inductors L1 and L2, one antenna E1, two resistors R1 and R2, and one oscillator Y1. The control unit 80 is connected to the resistor R2 for control the transistor Q1 to turn on or turn off so as to control the transmission of the standard EM wave RFS. It should be noted that the circuit shown in FIG. 4 is only illustrative, and thus, other elements or devices with the equivalent wireless transmission function can be applied to the standard EM wave transmit unit 70.

Figure 5:
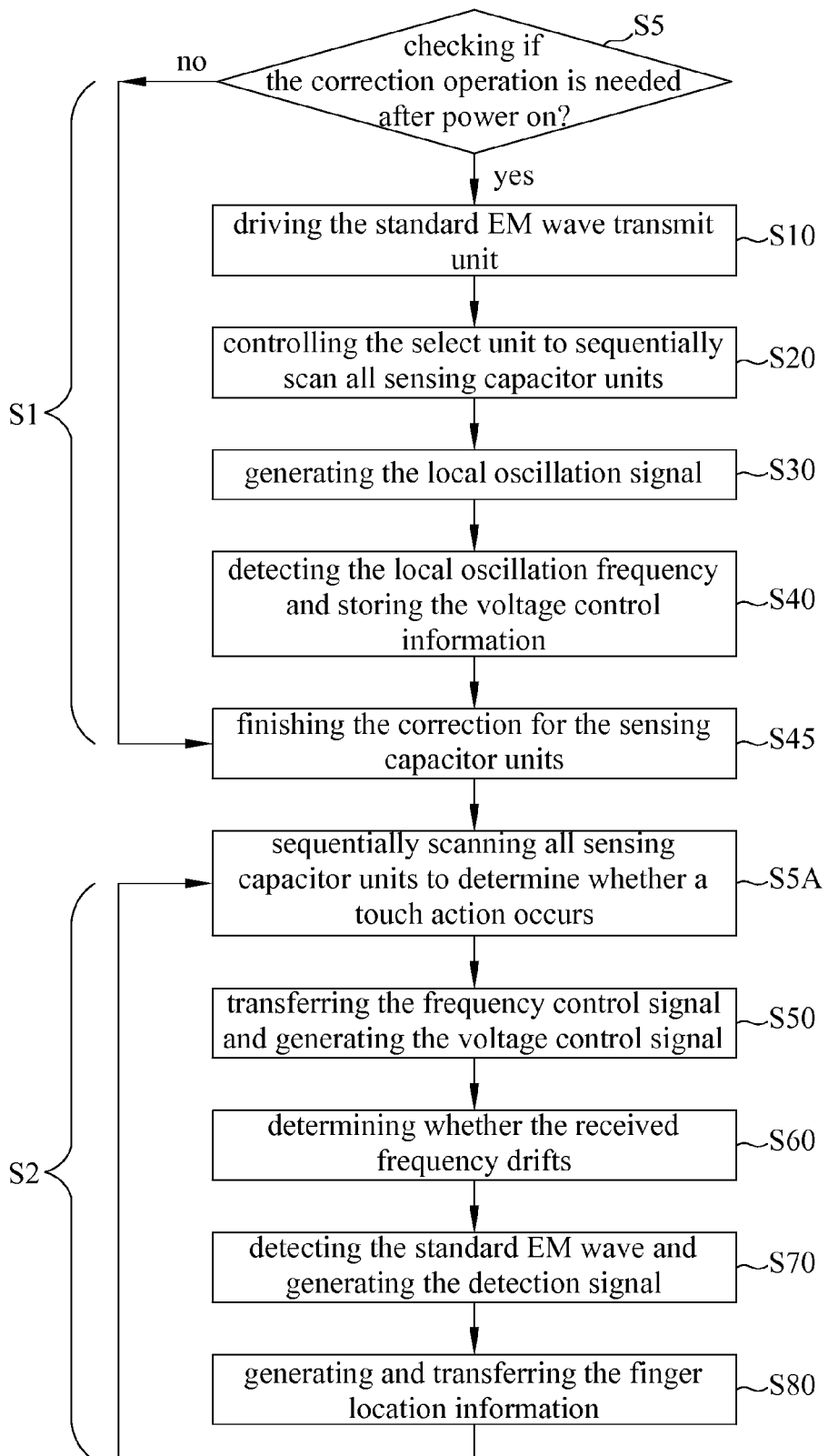
FIG. 5 is a flowchart showing the finger detection process employed in the electromagnetic sensing touch screen according to the present invention.

Therefore, the overall function provided by the electromagnetic sensing touch screen of the present invention substantially generally includes using the control unit 80 to perform the finger detection for correctly detecting the location of the finger(s) FG in the sensing capacitor matrix 20, and determining how close the finger(s) FG approaches to the sensing capacitor matrix 20 or whether the finger(s) FG touches the sensing capacitor matrix 20. More specifically, as shown in FIG. 5, the finger detection comprises the initialization operation S1 and the detection operation S2.

Specifically, the control unit 80 first performs the initialization operation S1, comprising the steps S5, S10, S20, S30, S40 and S45. Firstly, in the step S5, it is checked that the correction process is needed for the sensing capacitor units after power on. If the correction process is not needed, the step S45 is directly performed by straightly using the original correction data to correct the sensing capacitor units. If the correction process is needed, the step S10 is performed.

In the step S10, the standard EM wave transmit unit 70 is driven to transmit the standard EM wave RFS when the finger(s) FG is far away from the sensing capacitor matrix 20.

Next, the step S20 is performed by using the control unit 80 to transfer the scan select signal SS to control each select unit 30 such that the select unit 30 sequentially receives they sensed capacitance values CV generated by the sensing capacitor units 21, and thus generates the final sensed capacitance value FC for controlling the frequency of the local oscillation signal LC. Whether the standard EM wave RFS is received is used to scan all the effective regions of the display panel 10.

In the step 30, the VCO 40 generates the local oscillation signal LC based on the final sensed capacitance value FC. Since there exists some difference among the capacitances of the sensing capacitor units 21 due to the process drift, the local oscillation signals LC generated by different VCOs 40 also have the problem of frequency drift. As a result, the detection signal DS generated by the EM wave receive/detection units 60 according to the local oscillation signals LC will vary.

Then in the step S40, the local oscillation signals LC of all VCOs 40 are sequentially received by the control unit 80, preferably through the 4:1 multiplexer and/or the pre-scaler and/or the frequency divider so as to calculate the frequency without compensation by a lookup table and generate the frequency control signal CS for compensation. The voltage control signal VS is subsequently generated by the digital potentiometer 50 and received by the VCO 40, thereby adjusting the local oscillation frequency of the local oscillation signal LC for compensating the difference due to the different locations of the sensing capacitor units provided in the sensing capacitor matrix 20 in case of no capacitor being touched.

As a result, a closed loop for self-control is formed such that the local oscillation frequency after compensation fits desired value for receiving the standard EM wave. The above correction process continues until all the control units 80 generate the local oscillation frequency after compensation for correctly receiving the standard EM wave when the finger(s) FG does not approach to or touch the sensing capacitor units 21. At this time, the control unit 80 stores the frequency control signal CS as the voltage control information. Finally, the step S45 is performed to finish the correction process for the sensing capacitor units 21. The initialization operation S1 is thus completed.

In short, the initialization operation S1 is primarily intended to correct the touch operation of the whole electromagnetic sensing touch screen for compensating the drift caused by the respective units or the environment, thereby improving the stability and preciseness of the touch function.

As for the detection operation S2, the steps S5A, S50, S60, S70 and S80 are included. Firstly, in the step S5A, all the sensing capacitor units are sequentially scanned. It is primarily intended to determine if the touch action happens. Next, in the step S50, when the finger(s) FG approaches to or touches any one of the sensing capacitor units 21, the control unit 80 directly uses the voltage control information stored to transfer the frequency control signal CS to the digital potentiometer 50 generating the voltage control signal VS. Subsequently, the step S60 is performed by driving the VCO 40 to receive the voltage control signal VS and adjust the local oscillation frequency of the local oscillation signal LC according to the final sensed capacitance value FC of the select unit 21. If the finger(s) FG approaches to or touches any one of the sensing capacitor units 21, the local oscillation signal LC changes, and accordingly, the local oscillation frequency changes. As a result, the frequency drift with respect to the standard EM wave RFS occurs.

In the step S70, the EM wave receive/detection units 60 employs the local oscillation signal LC to detect the standard EM wave RFS, and generates the detection signal DS indicating how close the finger(s) FG approaches to or touches the sensing capacitor units 21. The step S80 is then performed by using the control unit 80 to determine whether the frequency drift happens or the degree of the frequency drift based on the detection signal DS. If the intensity of the detection signal DS is lower than the preset threshold, the location of the corresponding sensing capacitor unit 21 is taken as the location of the finger(s) FG, and the finger location information further transferred. Finally, back to the step S5A, in which all the sensing capacitor units are sequentially scanned, the subsequent steps are repeated.

From the above description, one of the aspects of the present invention is to employ the electromagnetic wireless transmission for the EM wave to implement the touch function for the touch screen. In other words, the standard EM wave transmit unit transmits the standard EM wave, and the EM wave receive/detection unit receives and detects the standard EM wave so as to generate the detection signal by use of the local oscillation signal. Since the finger(s) affects the capacitance value of the sensing capacitor unit in the sensing capacitor matrix, the local oscillation frequency of the local oscillation signal drifts. The variation of the intensity of the detection signal is used to determine whether the frequency drift between the local oscillation signal and the standard EM wave occurs, thereby simultaneously detecting the location of at least one finger approaching to or touching any sensing capacitor unit. As a result, the finger location information is generated.

Therefore, as for the whole function, the present invention employs the scan select signal to perform the scan/detection operation for all the sensing capacitor units of the sensing capacitor matrix in each scanning cycle. At the same time, the location of at least one finger approaching to or touching any sensing capacitor unit is detected, thereby implementing the multi-touch display function for correctly detecting the gestures of the fingers such as pressing, sliding, dragging, expanding, kneading or rotating.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An electromagnetic sensing touch screen for detecting a location of at least one finger by use of frequency drift for electromagnetic (EM) wave to implement a multi-touch display function, comprising a display panel, a sensing capacitor matrix, select units, voltage controlled oscillators (VCOs), digital potentiometers, EM (electromagnetic) wave receive/detection units, a standard EM wave transmit unit and a control unit, wherein the corresponding select unit, VCO, digital potentiometer and EM wave receive/detection unit constitutes a single detection unit;

wherein the display panel is connected to an external image input device to receive image information and display an image;

wherein the sensing capacitor matrix possesses full or part transparency, and is provided close to the display panel, the sensing capacitor matrix comprising a plurality of sensing capacitor units, each corresponding to one specific region of the image displayed by the display panel, the sensing capacitor unit used to generate a sensed capacitance value by changing an equivalent capacitance value according to how the finger approaches;

wherein the select unit is connected to a corresponding one of the sensing capacitor units of the sensing capacitor matrix, and comprises a plurality of multiplexers hierarchically arranged for selecting one of the sensed capacitance values from the sensing capacitor matrix as a final sensed capacitance value and a resonant capacitance for the VCO based on a scan select signal generated by the control unit, and transferring the sensed capacitance value selected;

wherein the VCO receives the final sensed capacitance value and a voltage control signal generated by the digital potentiometer for controlling a varactor diode so as to generate a local oscillation signal with a local oscillation frequency;

wherein the EM wave receive/detection unit uses the local oscillation signal of the VCO to receive a standard EM wave from the standard EM wave transmit unit, a detection signal is generated through a detection operation, and the standard EM wave contains a standard signal;

wherein the control unit is connected to the select units, the digital potentiometers and the EM wave receive/detection units to perform a finger detection operation for generating the scan select signal used to control each select unit to select the final sensed capacitance value, and the control unit simultaneously receives the detection signal and performs frequency modulation to generate the frequency control signal;

wherein the digital potentiometer receives the frequency control signal to perform potential adjustment so as to generate the voltage control signal such that the VCO adjusts the local oscillation frequency of the local oscillation signal according to the voltage control signal; and wherein the standard EM wave transmit unit is driven by the control unit to generate and transmit the standard EM wave to the EM wave receive/detection units.

2. The electromagnetic sensing touch screen as claimed in claim 1, wherein the sensing capacitor units are arranged in a matrix having X columns and Y rows.

3. The electromagnetic sensing touch screen as claimed in claim 1, wherein the EM wave receive/detection unit comprises an antenna and a signal detector, the antenna receives the standard EM wave, and the signal detector detects the detect signal indicating the intensity of the standard EM wave received.

4. The electromagnetic sensing touch screen as claimed in claim 1, wherein the control unit is implemented by a MCU (microcontroller).

5. The electromagnetic sensing touch screen as claimed in claim 1, wherein the digital potentiometer comprises an electrically erasable potentiometer (EEPOT).

6. The electromagnetic sensing touch screen as claimed in claim 1, wherein the finger detection operation of the control unit comprises an initialization operation and a detection operation, the initialization operation corrects the touch operation by compensating the drift caused by the respective units or environment, and the detection operation detects the location of the finger to generate finger location information, and transfers the finger location information to an external processing unit or device, comprising a USB (Universal Serial Bus) device or computer.

7. The electromagnetic sensing touch screen as claimed in claim 1, wherein the sensing capacitor unit are substantially sensing capacitor nodes formed by a plurality of horizontal driving lines and a plurality of vertical sensing lines, which are interlaced to each other, and the driving line and the sensing lines interlaced are not physically in contact, but separated by a distance or by a high impedance film.

* * * * *